Patented July 6, 1943

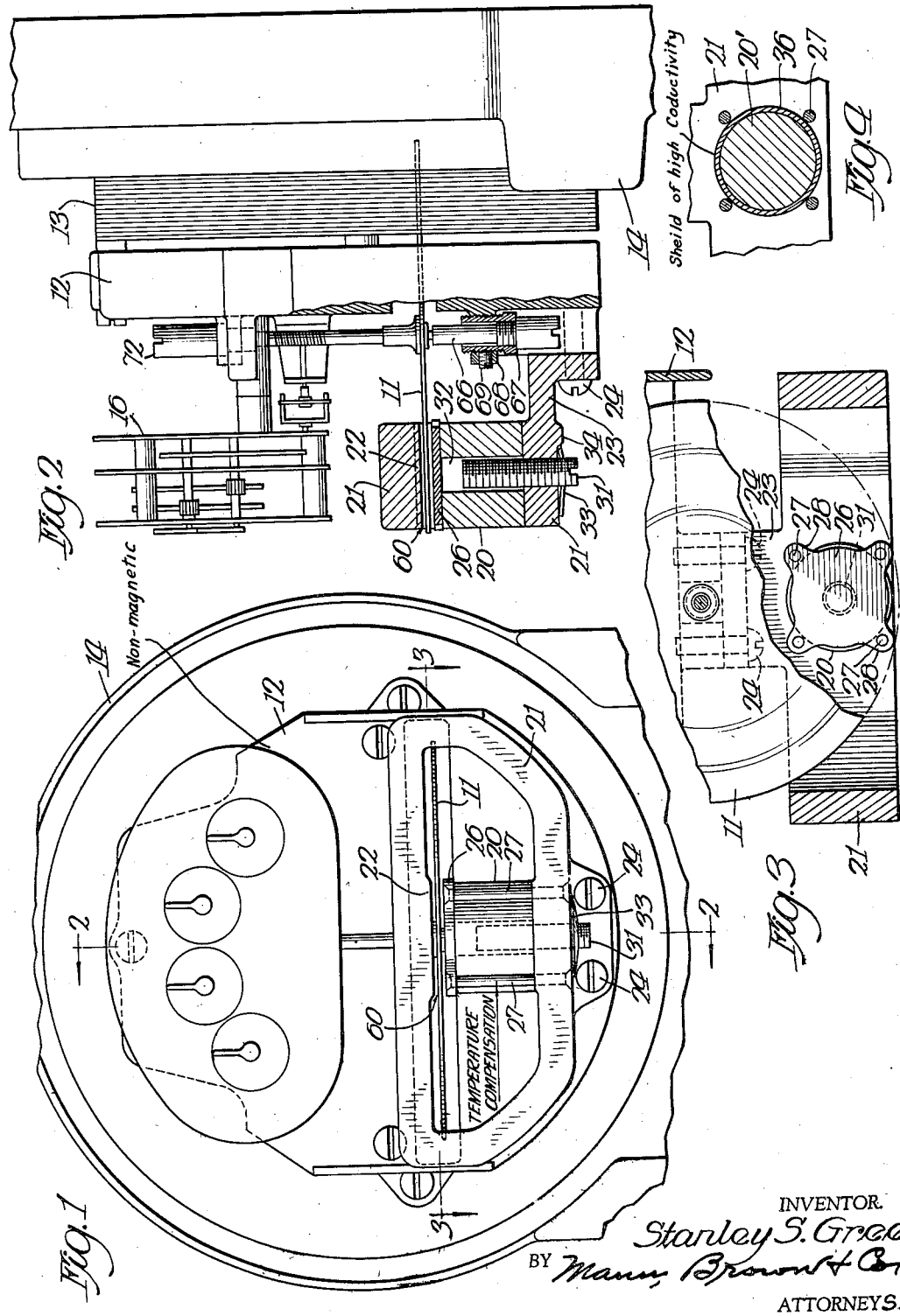

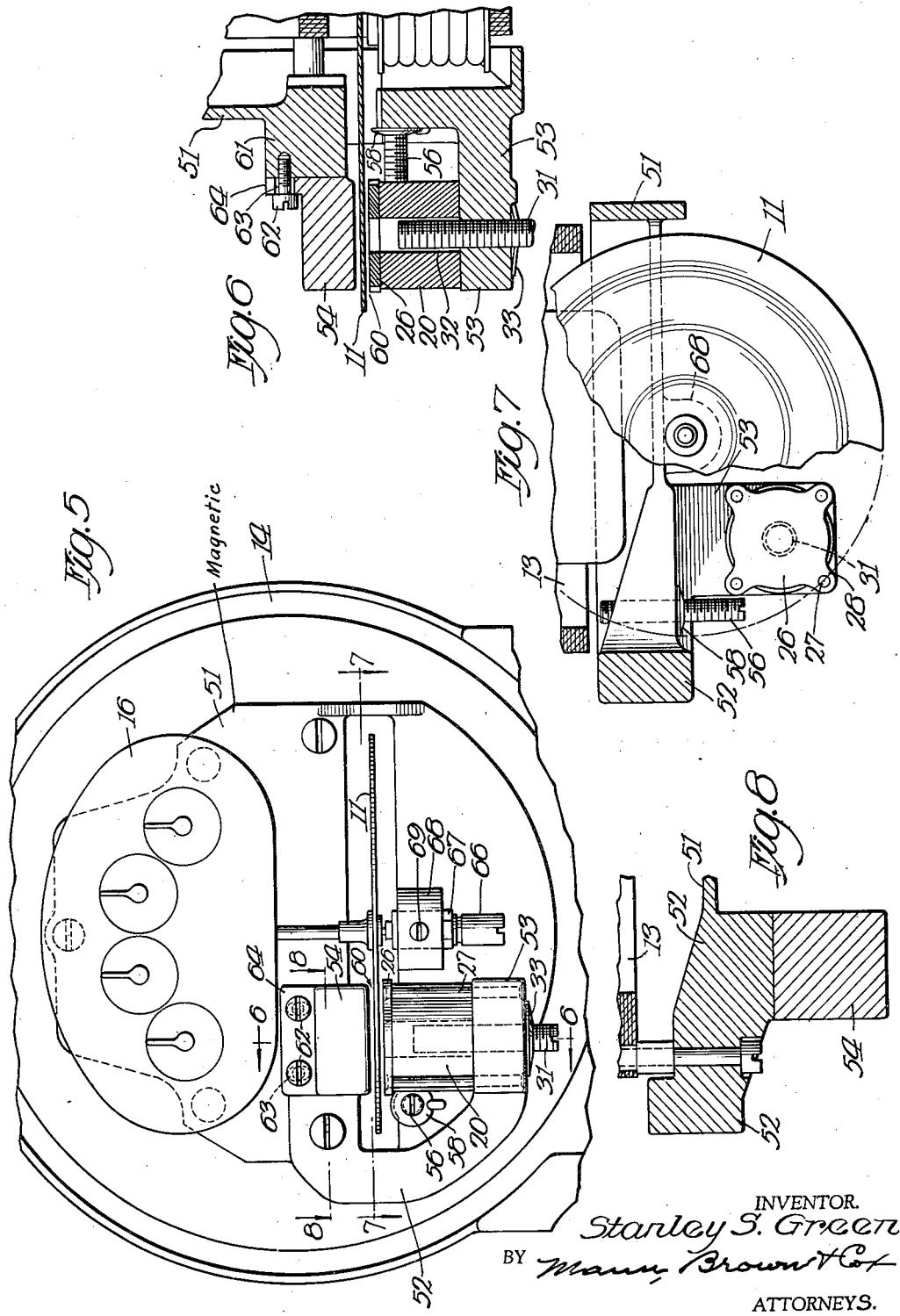

2,323,465

UNITED STATES PATENT OFFICE 2,323,465

DAMPING UNIT FOR WATT-HOUR METERS

Stanley S. Green, La Fayette, Ind., assignor to Duncan Electric Manufacturing Company, La Fayette, Ind., a corporation of Illinois Application February 21, 1940, Serial No. 320,151

10 Claims. (Cl. 171—34)

In watt-hour meters it is necessary to provide some means for retarding the disc so that its speed will be proportional to the power consumption in the measured circuit. The universal practice is to provide a permanent magnet so arranged that magnetic flux from the magnet is caused to pass through the disc. As the disc rotates through the field of the magnet, eddy currents are induced in the disc which in turn react with the magnetic field to retard the the disc.

Until recently, two magnets have usually been provided, each straddling the disc, and the two magnets being close enough together to produce two closely spaced magnetic fields. This arrangement is more than twice as effective as one of the magnets alone, providing that the magnets are disposed oppositely so that one has its north pole above the disc while the other has its south pole above the disc, thus producing two adjacent fields which are of opposite polarities. These two damping magnets and their supporting means have represented a considerable part of the cost of the meter. The present inventor has heretofore reduced this cost somewhat by using a single U-shaped magnet having both of its poles adjacent the disc with a soft iron armature forming a flux path on the far side of the disc so that the magnetic flux passes from one pole of the magnet, through the disc, through the armature, and again through the disc to the other pole of the magnet. The present invention contemplates an optional structure for reducing the cost as compared to the old twin-magnet damping unit. As costs are gradually reduced in practice, this structure may even prove to be more economical than the recently developed U-shaped magnet damping unit.

The present invention proceeds on the theory of providing a permanent magnet of extremely simple and inexpensive shape with the magnetic path completed by a soft iron yoke (which may be part of the meter frame), the dimensions of the magnet and yoke being sufficient to provide adequate damping for the disc with a single magnetic field, and the manner of securing the magnet to the yoke being inexpensive and leaving the efficiency of the magnet unimpaired.

Additional advantages and objects of the invention will be apparent from the following description and from the drawings, which should be regarded as largely diagrammatic and in which:

Fig. 1 is a front view of one form of meter chosen for illustration of this invention.

Fig. 2 is a vertical cross section approximately on the line 2—2 of Fig. 1.

Fig. 3 is a horizontal cross section approximately on the line 3—3 of Fig. 1.

Fig. 4 is a horizontal cross sectional view through an alternative form of magnet assembly.

Fig. 5 is a front view of another form of the invention chosen for illustration.

Fig. 6 is a fragmentary view taken approximately on the line 6—6 of Fig. 5.

Fig. 7 is a horizontal sectional view taken approximately on the line 7—7 of Fig. 5.

Fig. 8 is a fragmentary horizontal sectional view taken on the line 8—8 of Fig. 5.

Two preferred forms of the invention have been chosen for illustration and description, in compliance with section 4888 of the Revised Statutes, but persons skilled in the art will readily perceive other means for accomplishing the same results; and the claims are therefore to be construed as broadly as possible, consistent with the prior art.

In both forms of the invention the meter may comprise a rotating disc 11 rotatably carried by a frame 12 (51 in Figs. 5 to 8) which in turn is carried by a driving unit 13 mounted on a meter base 14. The disc 11 of course drives suitable indicating mechanism such as a register 16. The disc 11 rotates with extremely little friction and it therefore follows that a relatively small amount of driving force applied to the disc inductively by the driving unit 13 could make the disc spin very fast unless some means were provided for retarding or damping the disc to a speed proportional to the power consumption being measured. This means is conventionally provided by one or more permanent magnets which are arranged to provide one or more magnetic fields traversing the disc.

Heretofore it has been considered necessary, in order to obtain adequate damping or retarding torque economically, to provide two closely adjacent magnetic fields of opposite polarity. According to the present invention, economical and satisfactory damping can be obtained by only one field, thus permitting simplification of the magnet structure.

In Figs. 1 to 3 there is a single permanent magnet 20 in the form of a simple cylinder which is carried by a yoke 21. The yoke 21 forms a magnetic path around the edges of the disc and may be provided opposite the magnet 20 with a projection 22, the face of which may for convenience be called a gap face in that a disc-receiving gap is formed between this gap face 22 and the magnet 20.

The magnet 20 is formed of some highly coercive magnetic material, such as that known commercially as "Alnico." Of course, other magnetic materials, such as those described in my prior Patent No. 2,110,418, issued March 8, 1938, may be used. The yoke 21 is preferably formed of a material which has substantially no permanency and which has relatively high permeability. In the interests of economy of production it will probably be cast and it may therefore be made of cast iron or cast steel, both of which may have such composition and heat treatment as will give them the greatest permeability and preferably also the least magnetic permanence. Since cast steel has greater permeability than cast iron and is less fragile, its use is preferred.

The magnet 20 and yoke 21 may be supported by a bracket 23 which may be formed integrally on the yoke 21 and may be secured to the meter frame 12 by screws 24.

The magnet 20 may be secured to the yoke 21 by means of a face plate 26 of soft iron or like material having good permeability, and a plurality of rivets 27. The rivets may extend through lugs 28 formed on the face plate 26 and may extend outside of the magnet 20 and then through the yoke 21.

Any flux paths outside the magnet from its upper pole to its lower pole, as, for instance, through the rivets, divert flux which would otherwise be forced to cross the gap and be useful braking flux. Temperature compensation for the meter may therefore be provided by forming one or more of the rivets 27 of a metal having a negative coefficient of permeability, such as nickel steel. Although it is conventional to provide temperature compensation by a member having a negative coefficient of permeability, it will be observed that this is an exceedingly economical way in which to provide such compensation, since it is provided by the securing means for the magnet. Although four rivets 27 have been illustrated, two or three would probably hold the magnet 20 adequately and sufficient temperature compensation would probably be provided by forming one or two of these of nickel steel. Different meters require different amounts of compensation and of course the compensation provided by each rivet would depend upon its diameter. The choice of a number and a diameter of rivets is therefore a matter of design for each meter.

The face plate 26 has been illustrated as of somewhat smaller diameter than the diameter of the magnet 20. This tends to concentrate the flux, so as to increase its damping effect on the meter. Of course, the lugs 28 spread the flux out somewhat, and it is therefore especially desirable to make the plate 26 of a relatively small diameter aside from the lugs 28 so that the spreading effect of the lugs will be overcome or minimized by the concentrating effect of the small diameter.

It is customary to adjust meters for accuracy by adjusting the strength of the magnetic damping field through which the disc rotates. According to the illustrated form of the invention this may be accomplished by providing a screw 31 of magnetic material. This screw may screw upwardly through a passage 32 in the magnet 20, being threaded through the bottom of the yoke 21. It is obvious that the screw provides a path from pole to pole inside the magnet to shunt or by-pass flux which would otherwise cross the gap. Depending upon the screw position the magnitude of this shunting effect may be varied. There is preferably provided suitable means for retaining the screw 31 in the position to which it is adjusted and for preventing backlash in its adjustment. A cupped threaded washer 33 has been illustrated, but it may be considered a mere diagrammatic representation that some means for accomplishing its purpose should be provided. A lug 34 may be formed on the yoke 21 to engage a slot in the washer 33 for preventing turning of the washer. The washer is held in a sprung condition while the screw 31 is screwed through it and into yoke 21, and the relative angular positions of the threads in the washer 33 and the yoke 21 are such that the washer 33 will continue to exert a resilient downward pressure on the screw 31. Of course, a setscrew could be provided for merely locking the screw 31 in its adjusted position.

The passage 32 may be formed in the magnet 20 either by drilling or molding, molding being preferred because it is cheaper. Since Alnico, of which the magnet 20 is preferably made, is conventionally cast, the molding of the passage 32 will not involve any extra steps.

Because of its simple form, the magnet 20 may be cast very economically and is therefore a very low cost unit. As a matter of fact, it may be cast in the form of a long bar or tube and cut into suitable lengths.

In Fig. 4 I have illustrated a modified form of the invention in which the magnet 20 is surrounded by a sleeve 36 of highly conductive material, such as copper. The purpose of this sleeve is to protect the magnet 20 against the weakening effects of stray magnetic fields, such as might be produced, for example, when lines to which the meters are connected are struck by lightning. Although Alnico is exceptionally immune to such weakening effects, the added protection of the sleeve 36 may be desirable under some conditions. It will be observed that the sleeve 36 may be formed with extremely low cost since it is merely a length of copper tube. It preferably has a frictional fit with the magnet 20 to prevent rattle or play, and in that event no extra securing means is required for the sleeve 36.

It will be noted that Fig. 4 illustrates the magnet 20' as being solid in cross section. In that event its outside diameter may be slightly smaller for a given required damping torque and its cost may be slightly less. Of course, some other adjustment means would be provided, as, for example, means for shifting the entire magnet and yoke assembly radially of the disc 11. No such means need be illustrated since constructions in which the damping units are thus shifted are well known.

In the form of the invention shown in Figs. 5 to 8, a yoke corresponding to the yoke 21 is formed by the frame 51 which in this instance is formed of a magnetic metal while the frame 12 may be formed of a non-magnetic metal. The frame will be cast with a yoke portion 52 of enlarged cross section connecting a projection 53 below the disc with a projection 54 above the disc. The magnet 20 will thus be secured to the projection 53 in the same manner as it was secured to the yoke 21 in Fig. 1, namely, by a face plate 26 and rivets 27. Likewise, the magnet may have the form shown in Fig. 4 and may be protected by the sleeve 36 shown in Fig. 4, although no such sleeve has been illustrated in Figs. 5 to 8. It may be provided with the adjustment screw 31 and friction washer 33 of Figs. 1 to 3. An alternative damping adjustment may be provided by a screw 56 threaded into the frame and preferably provided with some means for retaining the screw in its adjusted position and eliminating backlash, such as the friction washer 58. Of course, although both the screws 31 and 56 have been shown in Figs. 5 to 8, normally only one of them will be provided and, if the screw 56 is provided, the magnet 20 will have the form of the solid magnet 20' of Fig. 4.

Each of the adjustment screws 31 and 56 function in substantially the same manner, namely by diverting flux from the gap 60 through which the disc rotates. In each instance the adjusting screw forms a magnetic path or shunt of high permeability between the two ends of the magnet 20. The screw 31 forms this path through the center of the magnet 20, while screw 56 together with the frame 51 and yoke portion or projection 53 forms a path externally of the magnet 20.

The yokes 21 and 52 have been shown thicker than is really necessary. However, by making them reasonably thick to carry the flux easily, the magnet 20 may be slightly shorter than would otherwise be necessary.

The form of the invention shown in Figs. 5 to 8 has several advantages over the form shown in Figs. 1 to 3. In the first place no special extra yoke is required but merely a thickening of certain portions of the frame. This results both in a reduction in weight and a saving in cost. Another advantage is that the damping unit is so positioned that the disc can be removed without removing the damping unit from the frame. It is quite common for the damping unit to be positioned across the front of the meter, as shown in Figs. 1 to 4, in which case it blocks the movement of the shaft of the meter disc so that the damping unit has to be removed before the disc can be removed. The structure of Figs. 5 to 8 overcomes this in a very simple and inexpensive manner. The structure of Figs. 5 to 8 also lends itself very easily to vertical adjustability of the magnet or of the projection 54 forming the opposite side of the gap from the magnet. It should be borne in mind that when parts are cast they vary slightly in dimensions from time to time. The gap faces and any joints in the magnetic path are preferably ground flat and true, but it is desirable to avoid grinding to predetermined dimensions, since grinding is expensive. To make grinding to dimensions unnecessary, the projection 54 may be vertically adjustable. The adjustability may be provided by securing the projection 54 to a protuberance 61, formed on the frame 51, by means of screws 62 operating in vertical slots 63 in a flange 64 formed on the projection 54. The adjoining faces will of course be ground flat. With this arrangement the projection or yoke member 54 may be accurately spaced from the face plate 26 by providing a spacer therebetween while the screws 62 are tightened. This gives an accurately predetermined length of gap for the disc 11 regardless of inaccuracies in the dimensions of the magnet 20 or the yoke portions 53 and 54. Since inaccuracies might still result in the disc being not quite centered within the gap, a gap centering adjustment may be provided. To this end the usual disc bearing holder 66 may be screwed into an adjustable bushing 67 which in turn screws adjustable into a lug 68 formed on the meter frame. Means may be provided for locking the bushing 67 at a desired position, such means comprising, for example, either a setscrew 69 or a screw drawing together two split portions of the lug 68. When the meter is assembled and after the bearing holder 66 has been screwed home in the bushing 67, the bushing 67 will be adjusted to a position to center the disc 11 in the gap 60, whereupon the setscrew 69 will be tightened. Thereafter, if the disc is removed for inspection or cleaning, this can be accomplished by unscrewing the bearing holder 66 (and the upper bearing holder 72) without disturbing the gap centering adjustment. Thus, when the disc is inserted and the bearing holder 66 is screwed back into place, it will again be screwed home into bushing 67, and, since this bushing will not have been moved, the positioning of the bearing holder 66 will be the same as before and hence the disc will still be centered in gap 60.

It should be observed, however, that the gap centering adjustment will not ordinarily be considered necessary. So long as adequate clearance is provided between the disc and the walls forming the gap, there is little need for adjustment. This is because of the fact that the nature of the present damping unit is such that there is very little variation in damping effect resulting from different positions of the disc in the gap. In other words, the field in the gap is relatively uniform vertically. This is due to the fact that there is a single field which is formed between two gap face members which are very similar in size and shape.

Although only a single magnet has been shown in each form of the invention, two magnets could be used, one above and one below the disc, if structural features or a need for extra damping torque should make this desirable.

From the foregoing it will be evident that a new, low cost damping unit has been provided—one in which the parts and assembly are inexpensive and simple. The permanent magnet material, which is relatively expensive, is used with great efficiency. All magnetic paths through this magnet are of the same length so that it can be as short as possible and still produce the required magnetic strength or coercive force. There are no screw holes in the magnet to shorten its effective length or cross section at the point of the screw holes. The yoke may be formed inexpensively by casting and in fact may be formed as part of the meter frame. The securing means are simple and may be used to provide the necessary temperature compensation. Very simple adjusting means may be provided.

I claim:

1. A watt-hour meter including a frame, a disc rotatably carried by the frame, a block of highly coercive magnetic metal having its pole faces at opposed ends thereof and having one of said pole faces adjacent one face of the disc, a support of magnetic metal adjacent the other face of the magnet for supporting the magnet, the support being carried by the frame, and a magnetic gap face member positioned adjacent the opposite face of the disc substantially in alignment with the magnetic block and communicating with the support through a yoke of magnetic metal including a portion of the frame, said portion being magnetic, said specified magnetic portions carrying return flux between the gap face member and the magnet.

2. A watt-hour meter including a frame, a disc rotatably carried by the frame, a block of highly coercive magnetic metal having its pole faces at opposed ends thereof and having one of said pole faces adjacent one face of the disc, a support of magnetic metal adjacent the other face of the magnet for supporting the magnet, the support being carried by the frame, and a magnetic gap face member positioned adjacent the opposite face of the disc substantially in alignment with the magnetic block and communicating with the support through a yoke of magnetic metal including a portion of the frame, said portion being magnetic and the support being formed integrally with the frame, said specified magnetic portions carrying return flux between the gap face member and the magnet.

3. A watt-hour meter including a frame formed at least in part of magnetic metal of low coercive strength, a disc rotatably carried thereby, extensions of magnetic metal of low coercive strength projecting from a magnetic portion of the frame with the disc rotating therebetween, and a magnet between the disc and one of the extensions and carried by said extension, having one pole face adjacent the disc and the other pole face adjacent said extension.

4. A watt-hour meter including a frame formed at least in part of magnetic metal of low coercive strength, a disc rotatably carried thereby, extensions of magnetic metal of low coercive strength projecting from the frame with the disc rotating therebetween, and a magnet between the disc and one of the extensions and carried by said extension, having one pole face adjacent the disc and the other pole face adjacent said extension, the frame having a magnetic portion of relatively heavy cross section extending around the disc and magnetically connecting the extensions.

5. A watt-hour meter including a frame formed at least in part of magnetic metal of low coercive strength, a disc rotatably carried thereby, extensions of magnetic metal of low coercive strength projecting from the frame with the disc rotating therebetween, and a magnet between the disc and one of the extensions and carried by said extension, having one pole face adjacent the disc and the other pole face adjacent said extension, the frame having a magnetic portion of relatively heavy cross section extending around the disc and magnetically connecting the extensions, and the extensions and magnet being positioned close to the point where said portion extends around the disc.

6. A damping unit for a watt-hour meter, including a single block of highly coercive magnetic metal having its pole faces facing in opposite directions, a substantially non-coercive yoke extending from one face of the magnet to a position opposite the other face but spaced therefrom to form a disc-receiving gap, and rivet means securing the magnet to the yoke, at least one of the rivets being formed of a metal of negative temperature coefficient of permeability extending approximately from pole face to pole face of the magnet.

7. A damping unit for a watt-hour meter, including a single block of highly coercive magnetic metal having its pole faces facing in opposite directions, a substantially non-coercive yoke extending from one face of the magnet to a position opposite the other face but spaced therefrom to form a disc-receiving gap, and means for securing the magnet to the yoke including a member performing at least part of the securing function and formed of a metal having a negative temperature coefficient of permeability extending approximately from pole face to pole face of the magnet.

8. A damping unit for a watt-hour meter, including a single block of highly coercive magnetic metal having its pole faces facing in opposite directions, a substantially non-coercive yoke extending from one face of the magnet to a position opposite the other face but spaced therefrom to form a disc-receiving gap, a plate of high permeability positioned at the far side of the magnet from the portion of the yoke to which the magnet is secured, and means for securing the plate and magnet to the yoke including a strip of metal performing at least part of the securing function and having a negative temperature coefficient of permeability.

9. A damping unit for a watt-hour meter, including a block of highly coercive magnetic metal having its pole faces facing in opposite directions, and a substantially non-coercive yoke extending from one face of the magnet to a position opposite the other face but spaced therefrom to form a disc-receiving gap; said block having a hole extending longitudinally therethrough and means for adjusting the damping unit comprising a magnetic member extending partially through said hole and movable therein by a screwing action to vary the effective flux through the disc receiving gap.

10. A watt-hour meter including a frame of magnetic material, a disc rotatably carried by the frame, a block of highly coercive magnetic material having a first pole face adjacent one face of the disc and having a second pole face at the opposite side of the block therefrom, a support of magnetic material adjacent the second pole face of the magnet for supporting the magnet, the support being carried by the frame and in magnetic continuity therewith, and a magnetic gap face member positioned adjacent the opposite face of the disc substantially in alinement with the first face and communicating magnetically with the frame; the only magnetic paths between said gap face member and the second pole face being through the magnet and the gap, and through the frame.

STANLEY S. GREEN.